(12) United States Patent
Rooke et al.

(10) Patent No.: US 7,798,477 B2
(45) Date of Patent: Sep. 21, 2010

(54) HYDRAULICALLY DAMPED MOUNTING DEVICE

(75) Inventors: Michael Paul Rooke, Chippenham (GB); Ian Nicholson, Melksham Wiltshire (GB); Martin James Spencer, Melksham Wiltshire (GB)

(73) Assignee: DTR VMS Limited (GB)

( * ) Notice: Subject to any disclaimer, the term of this patent is extended or adjusted under 35 U.S.C. 154(b) by 116 days.

(21) Appl. No.: 11/614,290

(22) Filed: Dec. 21, 2006

(65) Prior Publication Data

US 2007/0158889 A1 Jul. 12, 2007

(30) Foreign Application Priority Data

Jan. 9, 2006 (GB) .................................. 0600320.6

(51) Int. Cl.
F16F 7/00 (2006.01)
F16F 5/00 (2006.01)

(52) U.S. Cl. .................. 267/141.3; 267/141; 267/141.2

(58) Field of Classification Search ............ 267/140.12, 267/141, 141.1, 141.2, 141.3, 141.6, 141.7
See application file for complete search history.

(56) References Cited

U.S. PATENT DOCUMENTS

| | | | | |
|---|---|---|---|---|
| 2,938,744 A * | 5/1960 | Fritch | ........................ | 277/562 |
| 3,998,514 A * | 12/1976 | Hardesty | .................... | 439/418 |
| 4,392,033 A * | 7/1983 | Peterson | .................... | 200/80 R |
| 4,786,036 A | 11/1988 | Kanda | | |
| 4,822,010 A * | 4/1989 | Thorn | .................... | 267/140.12 |
| 4,861,004 A * | 8/1989 | Yokota et al. | .......... | 267/140.12 |
| 4,896,868 A | 1/1990 | Thelamon et al. | | |
| 4,898,264 A * | 2/1990 | Miller | ........................ | 188/275 |
| 4,971,456 A | 11/1990 | Hori | | |
| 4,982,938 A | 1/1991 | Brenner | | |
| 4,993,859 A * | 2/1991 | Assad et al. | ................ | 401/206 |
| 5,013,012 A | 5/1991 | Jouade | | |
| 5,058,866 A * | 10/1991 | Hamaekers et al. | .... | 267/140.12 |
| 5,092,565 A * | 3/1992 | Hamaekers et al. | .... | 267/140.12 |
| 5,118,087 A | 6/1992 | Jordens et al. | | |
| 5,123,633 A | 6/1992 | Kanda | | |
| 5,184,803 A | 2/1993 | Tanabe et al. | | |
| 5,299,788 A | 4/1994 | Kanda | | |
| 5,509,643 A | 4/1996 | Carstens et al. | | |

(Continued)

FOREIGN PATENT DOCUMENTS

DE 10146154 A1 4/2003

(Continued)

*Primary Examiner*—Melody M Burch
(74) *Attorney, Agent, or Firm*—McGarry Bair PC

(57) ABSTRACT

A hydraulically damped mounting device has a first anchor part; a second anchor part being a hollow sleeve containing the first anchor part, with the first anchor part extending axially of the sleeve; first and second resilient walls interconnecting the first and second anchor parts, two walls being spaced apart to define an enclosed space within the sleeve extending circumferentially around the first anchor part and axially bounded by the resilient walls. First and second deformable walls extend axially between the resilient walls at circumferentially spaced locations, so as to divide the enclosed space into first and second chambers for hydraulic fluid. A passageway interconnects the first and second chambers. The deformable walls have a flap, the movement of which is controlled by support devices so that the flap deforms to allow fluid to pass between the chambers only at or above a predetermined fluid pressure.

6 Claims, 13 Drawing Sheets

U.S. PATENT DOCUMENTS

| | | |
|---|---|---|
| 5,516,083 A | 5/1996 | Sprang et al. |
| 5,711,513 A | 1/1998 | Bretaudeau et al. |
| 6,102,380 A | 8/2000 | Tsutsumida |
| 6,168,144 B1 | 1/2001 | Bruehl |
| 6,239,486 B1 * | 5/2001 | Shimizu et al. ............ 257/704 |
| 6,276,671 B1 | 8/2001 | Fursdon et al. |
| 6,318,708 B1 | 11/2001 | Wolf et al. |
| 6,511,058 B1 * | 1/2003 | Vossel et al. ........... 267/140.12 |
| 6,527,261 B2 | 3/2003 | Breitfeld et al. |
| 6,644,365 B1 | 11/2003 | Spero et al. |
| 2005/0035507 A1 | 2/2005 | de Fontenany et al. |

FOREIGN PATENT DOCUMENTS

| | | |
|---|---|---|
| EP | 0172700 A1 | 8/1985 |
| EP | 0248714 A1 | 5/1987 |
| EP | 0335007 A2 | 12/1988 |
| EP | 0335005 A2 | 10/1989 |
| EP | 0418671 A1 | 3/1991 |
| EP | 0543082 B1 | 5/1993 |
| GB | 1242965 | 8/1971 |
| GB | 2193553 A | 2/1988 |
| GB | 2195166 A | 3/1988 |
| GB | 2291691 A | 1/1996 |
| GB | 2298019 A | 8/1996 |
| GB | 2322472 A | 8/1998 |
| GB | 2298018 A | 3/2007 |
| WO | 03033936 A1 | 4/2003 |
| WO | 2004007988 A2 | 1/2004 |
| WO | 2006061873 A1 | 6/2006 |

* cited by examiner

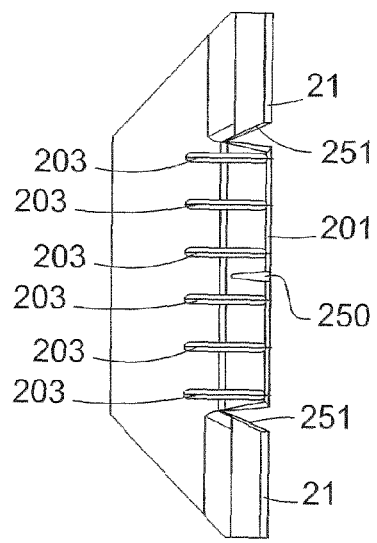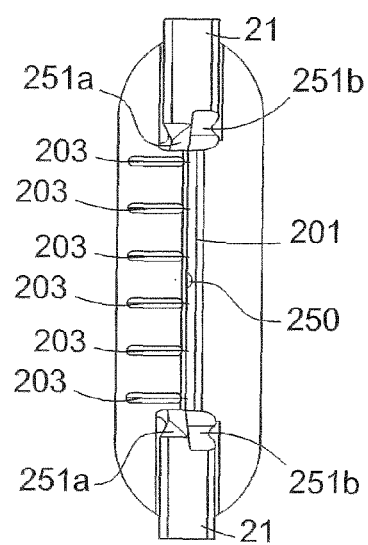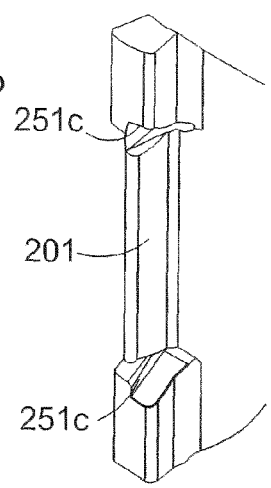
Fig. 14a   Fig. 14b   Fig. 14c
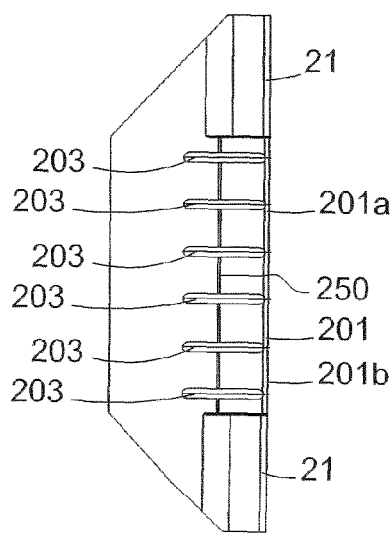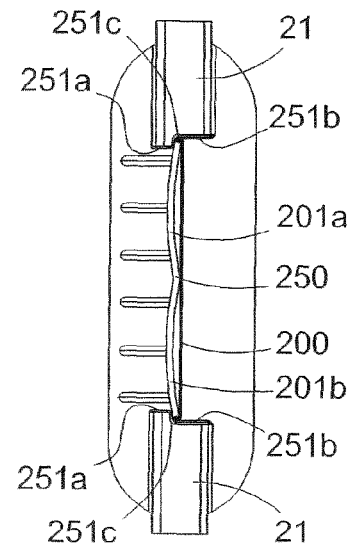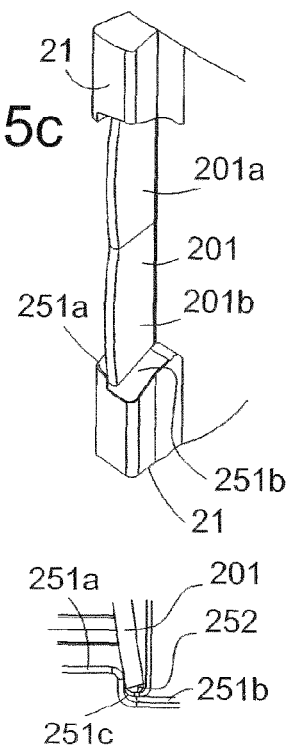
Fig. 15a   Fig. 15b   Fig. 15c   Fig. 15d

HYDRAULICALLY DAMPED MOUNTING DEVICE

CROSS-REFERENCE TO RELATED APPLICATIONS

This application claims priority on International Application No. GB 0600320.6, filed Jan. 9, 2006.

BACKGROUND OF THE INVENTION

1. Field of the Invention

The present invention relates to a hydraulically damped mounting device. Such a mounting device usually has a pair of chambers for hydraulic fluid, connected by a suitable passageway, and damping is achieved due to the flow of fluid through that passageway.

2. Summary of the Prior Art

In EP-A-0172700, a hydraulically damped mounting device of the "bush" type was disclosed which damped vibration between two parts of a piece of machinery, e.g. a car engine and a chassis. In a bush type of hydraulically damped mounting device, the anchor for one part of the vibrating machinery is in the form of a hollow sleeve, and the other anchor part is in the form of a rod or tube extending approximately centrally and coaxially of the sleeve. Resilient walls then interconnect the central anchor part and the sleeve to act as a resilient spring for loads applied to the mounting device. In EP-A-0172700, the resilient walls also defined one of the chambers (the "working chamber") in the sleeve, which chamber was connected via the elongate passageway to a second chamber (the "compensation chamber") bounded at least in part by a bellows wall which was effectively freely deformable so That it could compensate for fluid movement through the passageway without itself resisting that fluid movement significantly.

In GB-A-2291691, the arrangement disclosed in EP-A-0172700 was modified by providing a bypass channel from the working chamber to the compensation chamber. Under normal operating conditions, that bypass channel was closed by part of the bellows wall bounding the compensation chamber. At high pressures, however, the bellows wail deformed to open the bypass channel, thereby permitting fluid from the working chamber to pass directly into the compensation chamber without having to pass through the full length of the passageway.

In both EP-A-0172700 and GB-A-2291691, the resilient walls extended generally axially along the interior of the mount. Those walls therefore formed axially elongate blocks of e.g. rubber material which were configured to achieve the desired static spring requirements. The material of the block was deformed primarily in shear, to give maximum durability. As the resilient walls also formed walls of the working chamber, the axial ends of the working chamber were closed with material being integral with the resilient walls. In practice, however, the spring effect of those ends walls was small, so that the spring characteristic of the mount could be determined by the axially extending resilient walls.

GB-A-2322427 departed from this, by locating the resilient walls at axially spaced apart locations, unlike the arrangements in EP-A-0172700 and GB-A-2291691, in which the main spring effect is provided by axially extending, circumferentially spaced, resilient walls. The resilient walls of GB-A-2322427 thus defined an enclosed space within the sleeve, which extends circumferentially around the central anchor part, which space is axially bounded by the resilient walls.

It was then necessary to divide that space into two chambers, and connect those two chambers with a passageway, to form the hydraulic mounting device of the bush type. To provide that division, GB-A-2322472 proposed that axially extending walls extend between the central anchor part and the sleeve. Unlike the axially extending walls of the known arrangements, those walls do not need to provide a spring effect, since the spring effect is provided by the axially spaced resilient walls. Therefore, it is not necessary for those axially extending walls to be bonded to the sleeve and/or central anchor part. Instead, they made abutting, un-bonded, contact.

This permitted a bypass to be formed between the chambers without the need for a separate bypass channel, as in GB-A-2291691. By suitably selecting the abutment force of the axial walls against the sleeve and/or central anchor part, a pressure-sensitive seal was achieved. For pressures below a suitable level, the integrity of that seal was achieved by the force of abutment. For higher pressures, however, the seal was broken, thereby providing a path around the axial walls between the two chambers.

SUMMARY OF THE INVENTION

The present invention seeks to develop a mount of the general type shown in GB-A-2322427.

It has been found that, under certain conditions, there is a potential problem with the detailed arrangements described in GB-A-2322427. In GB-A-2322427, the axial walls form sleeves between the two chambers below a pre-determined pressure of hydraulic fluid, with those seals being released at pressures above the predetermined pressure. However, it has been found that the behavior of the seals at the point of release is not always satisfactory. In particular, a degree of release is not completely reliable. Since the release is due to overpressure, release may occur over a limited axial length of the seals, or over the full axial length of the seals, the degree of release varying, and therefore it is not always possible to ensure satisfactory release. In some cases it has been found that the deformation of the resilient walls away from the sleeve or first anchor part as appropriate, may not be sufficient to provide appropriate fluid bypass under some conditions. The degree of opening of that bypass route may not be sufficient. Therefore, the present invention seeks to modify the way that the deformable walls (axial walls) achieve their abutting, unbonded contact of the sleeve or first anchor part, to ensure more accurately controlled fluid release between the chambers when the pressures exceed the desired pre-determined value.

At its most general, the present invention proposes that the first and second deformable walls have flaps thereon, which flaps make abutting unbonded contact with the sleeve or first anchor part, and one or more support members are associated with the flaps, which support members hold the flaps in position at pressures below a pre-determined pressure, but permit those flaps to move out of contact with the sleeve or first anchor part above the pre-determined pressure. By use of such flaps and support members, a more accurate and controlled fluid release between the chambers can be achieved, since the size and shape of the flaps can control the size of the fluid path around the deformable walls of the predetermined pressure.

According to a first aspect of the present invention, there may be provided a hydraulically damped mounting device having:

a first anchor part;

a second anchor part in the form of a hollow sleeve containing the first anchor part, such that the first anchor part extends axially of the sleeve;

first and second resilient walls interconnecting the first and second anchor parts, the first and second resilient walls being spaced apart so as to define an enclosed space within the sleeve extending circumferentially around the first anchor part and axially bounded by the first and second resilient walls;

first and second deformable walls, each extending axially between the first and second resilient walls at circumferentially spaced locations, so as to divide the enclosed space into first and second chambers for hydraulic fluid;

a passageway interconnecting the first and second chambers, the passageway being for flow of hydraulic fluid therethrough;

wherein the deformable walls each have at least one flap forming an abutting un-bonded contact with the sleeve or first anchor part, and there is at least one support device associated with the or each flap, the at least one support device being arranged to resist deformation of the corresponding flap below a predetermined fluid pressure, to maintain that corresponding flap in said abutting unbonded contact, and to permit deformation of the corresponding flap above said predetermined fluid pressure, thereby to form a fluid path between said chambers around said flap.

Preferably the or each flap extends radially.

The second aspect of the invention also modifies the deformable walls, or at least one of those walls, and proposes that one or both of the walls contains at least one valved opening, which valved opening or openings interconnect the chambers. The valved opening is then arranged to permit the fluid to pass therethrough only when a predetermined pressure is reached.

Thus, according to a second aspect of the invention, there may be provided a hydraulically damped mounting device having:

a first anchor part;

a second anchor part in the form of a hollow sleeve containing the first anchor part, such that the first anchor part extends axially of the sleeve;

first and second resilient walls interconnecting the first and second anchor parts, the first and second resilient walls being spaced apart so as to define an enclosed space within the sleeve extending circumferentially around the first anchor part and axially bounded by the first and second resilient walls;

first and second deformable walls, each extending axially between the first and second resilient walls at circumferentially spaced locations, so as to divide the enclosed space into first and second chambers for hydraulic fluid;

a passageway interconnecting the first and second chambers, the passageway being for flow of hydraulic fluid therethrough;

wherein the deformable walls each makes abutting un-bonded contact with the sleeve or first anchor part, and there is at least one valved opening in at least one of the deformable walls interconnecting the first and second chambers, the at least one valved opening being arranged to permit fluid to pass therethrough only at or above a predetermined pressure.

Preferably, there is a valved opening in each deformable wall.

The valved opening may be formed by providing slits in the or each deformable wall, thereby permitting the material of the wall to deform to open the valve when the predetermined pressure is reached. A cross-shape slit pattern may be used to achieve this. It should be noted that, in the second aspect, it is preferable but not essential that the deformable walls each make abutting un-bonded contact with the sleeve or first anchor part. In the arrangements discussed with reference to GB-A-2322472, the fluid bypass between the chambers was around the edge of the deformable walls, which necessitated the unbonded contact with the sleeve of the first anchor part. In the second aspect, the bypass route is provided by the valved opening or openings, and therefore it is possible for the deformable walls to be bonded at their radially inner and outer edges.

As we mentioned above that valved opening may be formed by providing slits in the or each deformable wall. In such an arrangement, the material in which those slits are formed may be integral with the rest of the deformable wall. However, it may be possible to provide a separate component or components which are mounted in the deformable wall, and which forms the valved openings, e.g. by slits in resilient material or on other ways. Such an arrangement has the advantage that the properties of the material forming the valved parts of the valved opening may have different properties from the rest of the deformable wall. However, care then needs to be taken to ensure that the components of the valved opening are securely positioned in the deformable walls and can accommodate the deformation of the deformable wall that will occur when the mounting device operates.

BRIEF DESCRIPTION OF THE DRAWINGS

Embodiments of the present invention will now be described in detail, by way of example, with reference to the accompanying drawings, in which:

FIGS. 14a to 14c show a modification of part of the mounting device in FIG. 7, prior to insertion of the relevant parts in the sleeve of FIG. 11;

FIGS. 15a to 15d show that modification, when the relevant parts are inserted in the sleeve;

DETAILED DESCRIPTION

Figure 1:
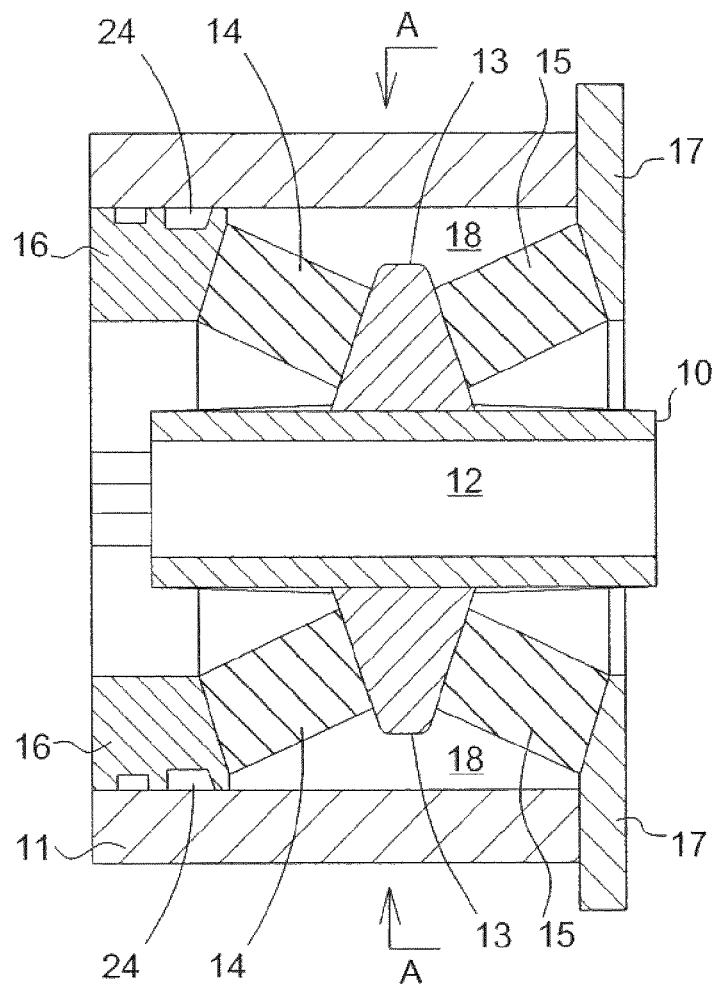
FIG. 1 is a longitudinal sectional view through a hydraulically damped mounting as described in GB-A-2322427.

As can be seen from FIG. 1, a "bush" type mount has a central anchor part 10 located within a sleeve 11 forming a second anchor part, to which one part of vibrating machinery may be attached. The central anchor part 10 has a bore 12 to which another part of the vibrating machinery may be attached. The central anchor part 10 has a projecting wings 13 from which extend resilient walls 14, 15. The resilient walls 14, 15 extend circumferentially around the central anchor part 10, and thus are generally in the shape of hollow frusto-cones with their frustums at the ridge 13 of the central anchor part 10, and their bases in contact with rings 16,17 which are secured to the sleeve 11. The inclined shape of the resilient walls 14, 15 therefore defines an enclosed space 18 within the sleeve 11. That space 18 is axially bounded by the resilient walls 14, 15, radially bounded outwardly by the sleeve 11, and radially bounded inwardly by the central anchor part, including parts of the projecting wings 13 of the central anchor part 10.

In order for the hydraulically damped mounting device to act as such, it is necessary for the space 18 to be divided into two chambers for hydraulic fluid. When those two chambers are connected by a suitable passageway, hydraulic fluid flows through the passageway from one chamber to the other as the mount vibrates, thereby to damp the vibration.

Figure 2:
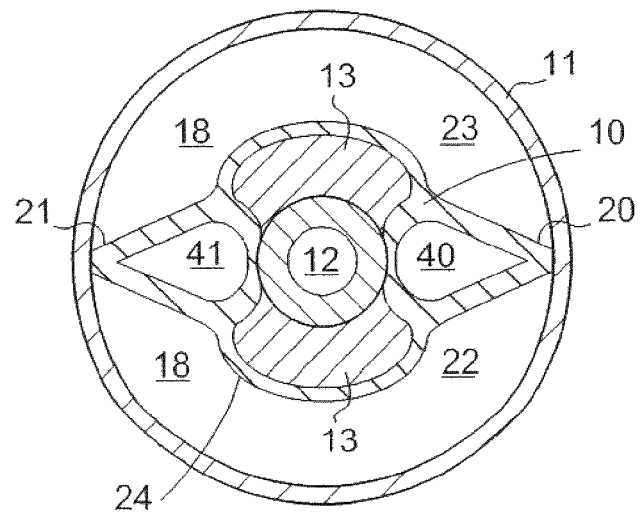
FIG. 2 is a transverse sectional view along the line A to A in FIG. 1.

As shown in FIG. 2, such division is achieved by flaps forming axially extending walls 20, 21 which extend axially between the resilient walls 14, 15 at circumferentially spaced locations (radially opposite in this embodiment), and thus divide the space 18 into two chambers 22, 23. Those chambers 22, 23 are then interconnected by a passageway 24 (see FIG. 1). Although not shown in FIG. 1, the passageway 24 opens into the two chambers 22, 23, respectively. Although this is not visible in FIG. 2, the chambers 22, 23 are axially bounded by the resilient walls 14, 15 because those walls axially bound the space 18. Each wall 14, 15 axially bounds both chambers 22, 23. The chambers 22, 23 are filled with hydraulic fluid.

Consider now vibration of the central anchor part 10 downwardly in FIGS. 1 and 2, relative to the outer sleeve 11. That movement reduces the volume of chamber 22 and so hydraulic fluid is forced from the chamber 22 through the passageway 24 to the chamber 23. That fluid movement through the passageway 24 damps the vibration. A similar effect is achieved when the central anchor part 10 vibrates inwardly, with fluid passing from the chamber 23 to the chamber 22. In each case, the resilient walls 14, 15 deform, primarily under shear, to act as a spring for the vibration. This is similar to the effect in known hydraulically damped mounting devices of the "bush" type, except that resilient walls 14, 15 axially bound the chambers 22, 23. In known hydraulically damped mounting devices, the resilient walls extend axially along the sleeve 10, and thus are generally in the location of the axial walls 20, 21 in FIG. 2.

Thus, although the axial walls 20, 21 are bonded to the wings 13 of the central anchor part 10, they are not bonded to the sleeve 11. Instead they are shaped so that they are forced into abutting contact with the sleeve. The force of abutment is predetermined so that, under normal operating conditions, the force of abutment exceeds any force applied to the axial walls 20, 21 by fluid pressures in the chambers 22, 23, so that the abutment forms a seal at the sleeve 11. Under such conditions, the only way for fluid to pass between the chambers 22 and 23 is via the passageway 24.

However, if the pressures in the chambers 22, 23 exceed predetermined values, which may occur under very high loads, the forces applied to the axial walls 20, 21 by the fluid pressures in the chambers 22, 23 will be sufficient to overcome the force maintaining the seal between the axial walls 20, 21 and the sleeve 11. The edges of the axial walls 20, 21 will be forced away from the sleeve 11, thereby creating a bypass route between the chambers 22, 23 between the edge of the axial walls 20, 21 and the sleeve 11. Thus, extreme overpressure, which may damage the mount, can be avoided.

It should be noted that the axial walls 20, 21 are not bonded to the sleeve 11, but are bonded to the wings 13 of the central anchor part. It would also be possible to have an arrangement in which the axial walls 20, 21 are bonded to the sleeve, but not the ridges 13, or even not bonded to either the wings 13 or the sleeve 11, provided that the positions of the axial walls 20, 21 could be suitably maintained by their bonding to the resilient walls 14, 15.

Figure 3:
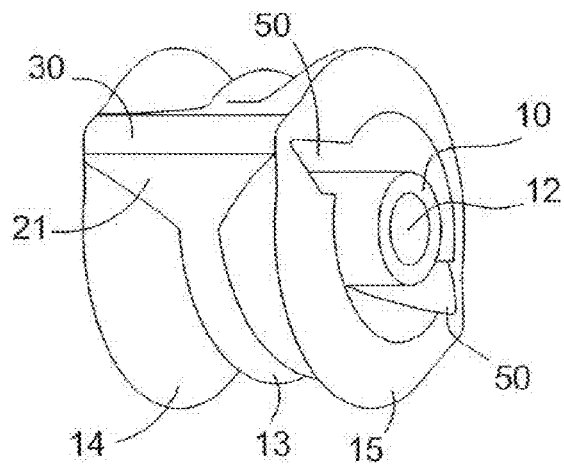
FIG. 3 is a perspective view of the hydraulically damped mounting device of FIG. 1 with the sleeve removed.

That attachment of the resilient walls 14, 15 and the axial walls 20, 21 is shown more clearly in FIG. 3. As can be seen from FIG. 3, the axial extent of the axial walls 20, 21 (only wall 21 is visible in FIG. 3) increases with increasing distance from the ridge 13 so as to extend between the resilient walls 14, 15. The outer edge of the resilient wall 20, 21 shown at 30 in FIG. 3, is then in abutting contact with the sleeve 11 (which is not shown in FIG. 3 for the sake of clarity).

Figure 4:
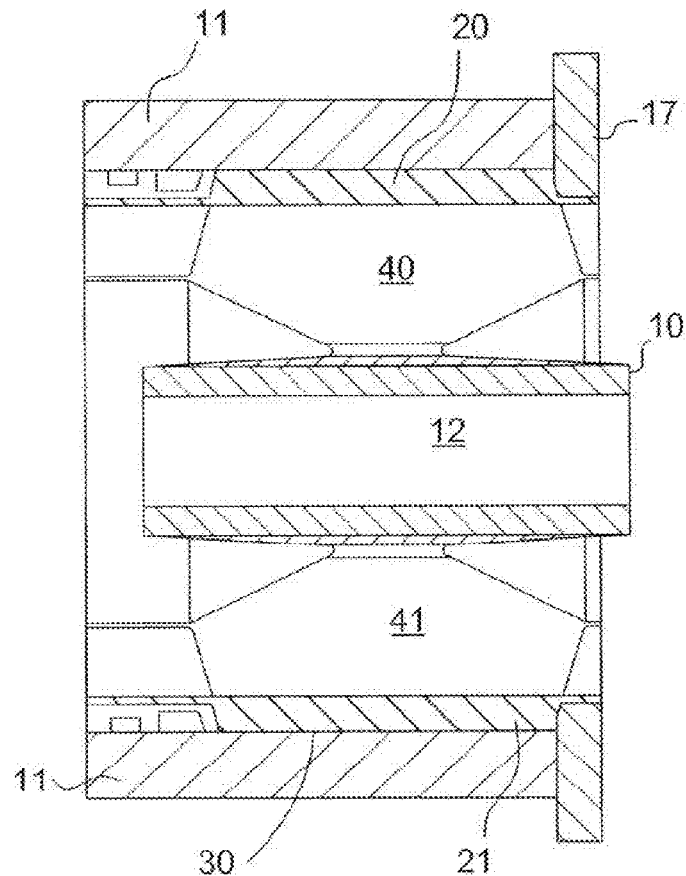
FIG. 4 is a longitudinal sectional view through the hydraulically damped mounting device of FIG. 1, in a direction perpendicular to FIG. 1.

FIGS. 2 and 4 also show that the axial walls 20, 21 are hollow and have voids 40,41 therein. These voids are preferable, rather than essential, but enable the dynamic stiffness of the mount to be tuned independently of the static stiffness. Since it is preferable for the resilient walls 14, 15 and the axial walls 20, 21 to be integrally moulded, there will be voids 50,51 in the resilient walls 14, 15 aligned with the voids 40,41 in the axial walls 20, 21 as can be seen in FIG. 3. If such voids are provided, they then form gaps in the circumferential extent of the resilient walls 14, 15 around the central anchor part 10. They do not significantly affect the spring characteristic of the mount, since the mount will normally be positioned so that the principal direction of vibration is perpendicular to the diameter joining those gaps 50,51 (i.e. vertically in FIGS. 1 and 2).

Figure 5:
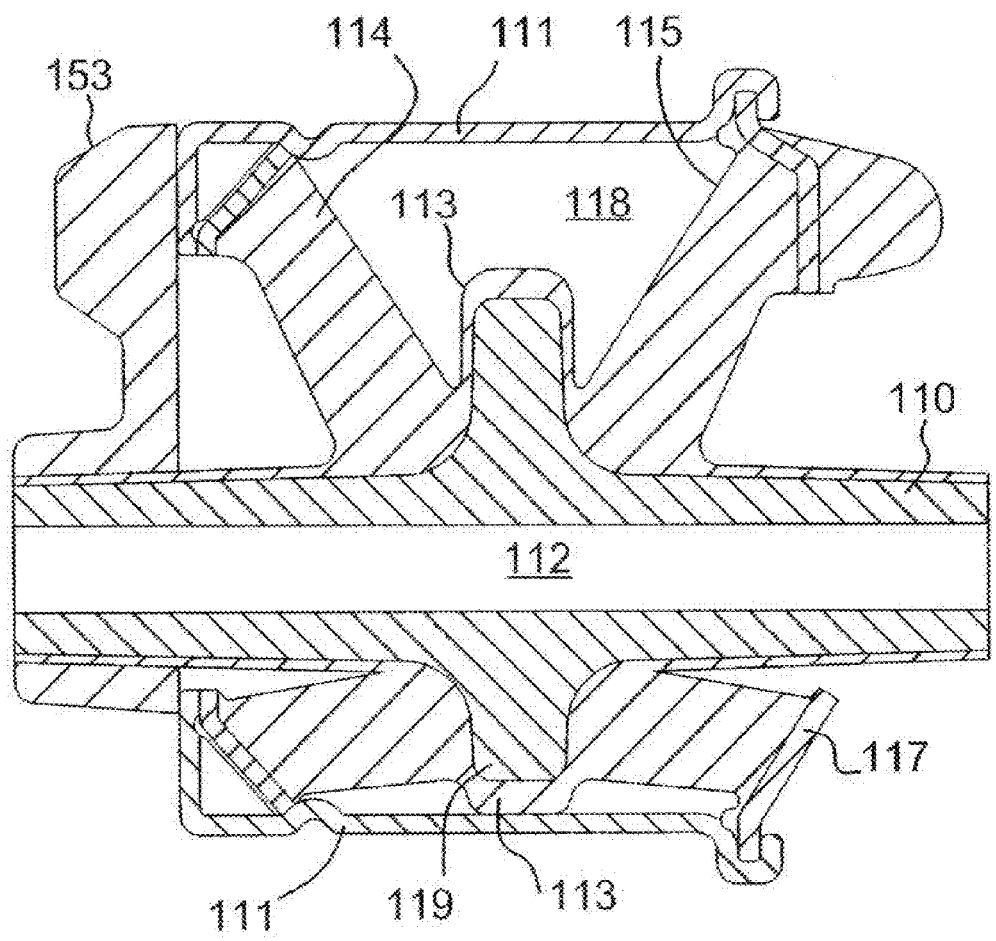
FIG. 5 is a longitudinal sectional view through another hydraulically damped mounting device described in GB-A-2322427.

FIG. 5 shows another hydraulically damped mounting device in which the central anchor part 110 is displaced from the longitudinal axis of the sleeve 111 (downwardly in FIG. 5) so that the projecting wing 113 makes contact with the inner surface of the sleeve 111. The resilient walls 114, 115 are frusto-conical portions, not of a right circular cone, but of a cone having an apex displaced (downwardly in FIG. 5) from the central longitudinal axis of the sleeve 111.

The mounting device 5 has the advantage that the mounting device is particularly able to bear loads which displace the central anchor part 111 towards the farther side of the sleeve (i.e. in the upward direction in FIG. 5).

The wing 113 is reinforced by a rib 119 extending radially from the central anchor part 110. A snubber 153 is located at one axial end of the sleeve 111.

Figure 6:
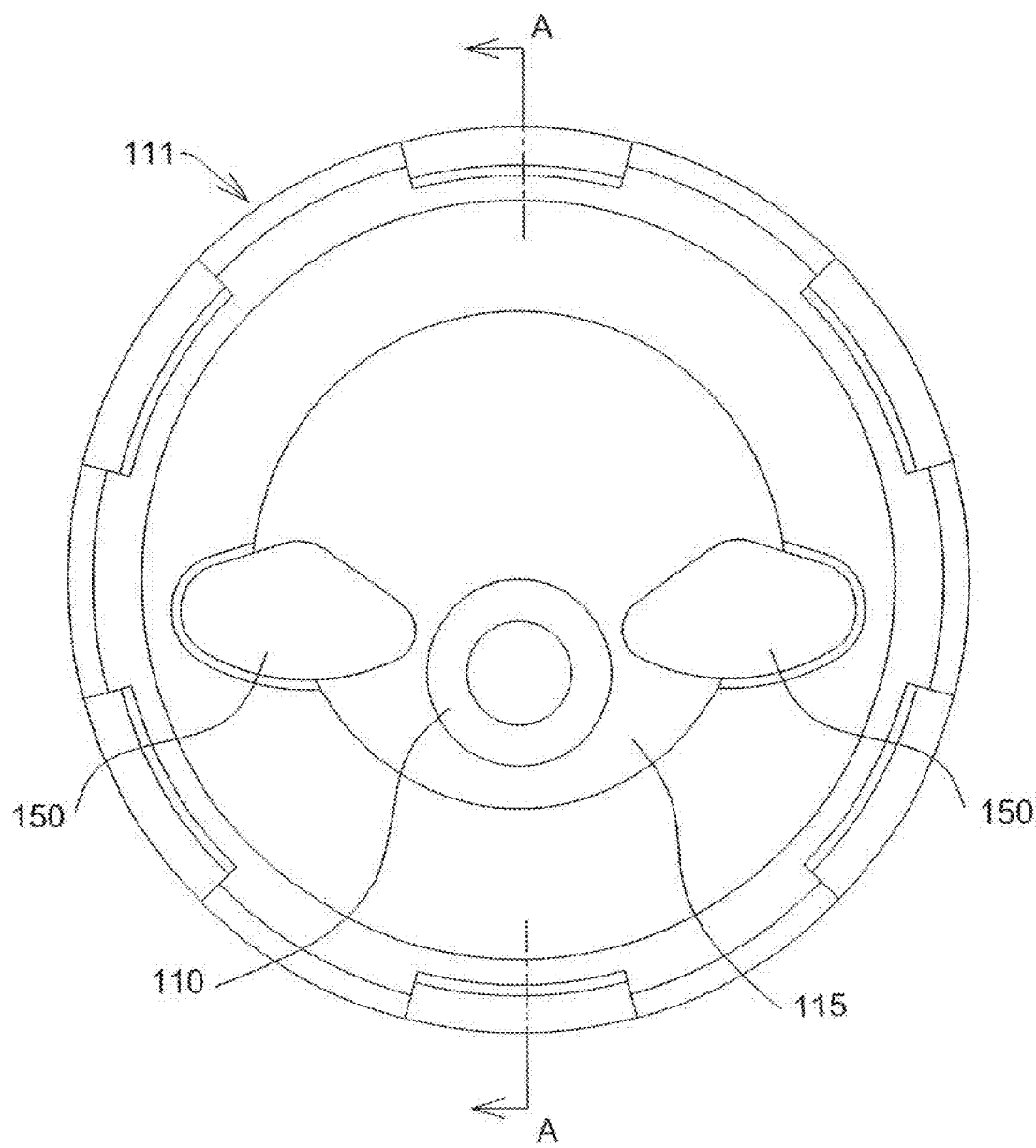
FIG. 6 is an end view of the hydraulically damped mounting device of FIG. 5.

FIG. 6 illustrates an end view of the mounting device of FIG. 5 as viewed from the right-hand side of FIG. 5. The view of FIG. 5 represents a cross-section of the mounting device along the plane A-A marked on FIG. 6. FIG. 6 illustrates gaps 150 in the resilient wall 115.

The above description of FIGS. 1 to 6 corresponds to the mounting device discussed in GB-A-2322427. A first embodiment of the present invention will now be described with reference to FIGS. 7 to 13. The principles of operation of this first embodiment are generally similar to the mounting device described with reference to FIGS. 1 to 6, and, where possible, corresponding parts are indicated by the same reference numerals.

The key difference between the first embodiment of FIGS. 7 to 13 and the mounting device of FIGS. 1 to 6 is the structure by which the axially extending walls 20, 21 make abutting un-bonded contact with the sleeve 11. In particular, in the first embodiment, those walls 20, 21 terminate in flaps 200, 201 and it is the free edges of those flaps 200, 201 remote from the central anchor part 10 which abut the sleeve.

Figure 7:
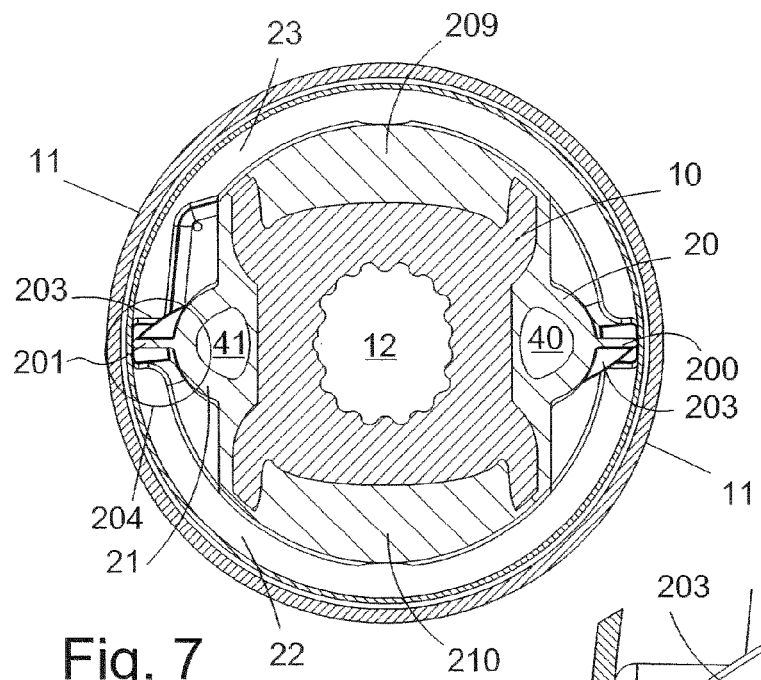
FIG. 7 is a transverse sectional view through a mounting device being a first embodiment of the present invention.

As can be seen from FIG. 7, the walls 20, 21 may be made hollow, by the presence of voids 40, 41 therein, as in the arrangement shown in FIG. 2, however, those voids 40, 41 affect the behaviour of the mount less than in the mounting device of FIGS. 1 to 6, because of the presence of the flaps 200, 201.

Figure 8:
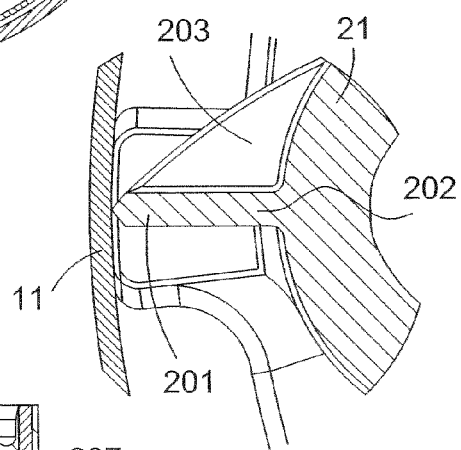
FIG. 8 is a detail of the mounting device of FIG. 7.

Flap 201 is shown in more detail in FIG. 8, with FIG. 8 corresponding to the circled part 204 in FIG. 7. Note that flap 200 is similar. Thus, FIG. 8 shows that the flap 201 is attached to the wall 21 at its inner end 202, which end 202 acts as a hinge for the rest of the flap 201. Moreover, on one side of the flap are support devices 203. Each support device 203 is in the form of a thin web attached to the flap 201 and to the adjacent parts of the wall 21, and is configured so that it provides rigid support to the flap 201 until a predetermined load is applied to the support device 203. At that predetermined load, the support device 203 is arranged to collapse. Thus, the support devices 203 resist movement of the flap 201 when the pressure difference between the chambers 22, 23 is less than a predetermined value, and permits movement clockwise in FIG. 8 when the pressure difference exceeds that predetermined value.

Figure 7A:
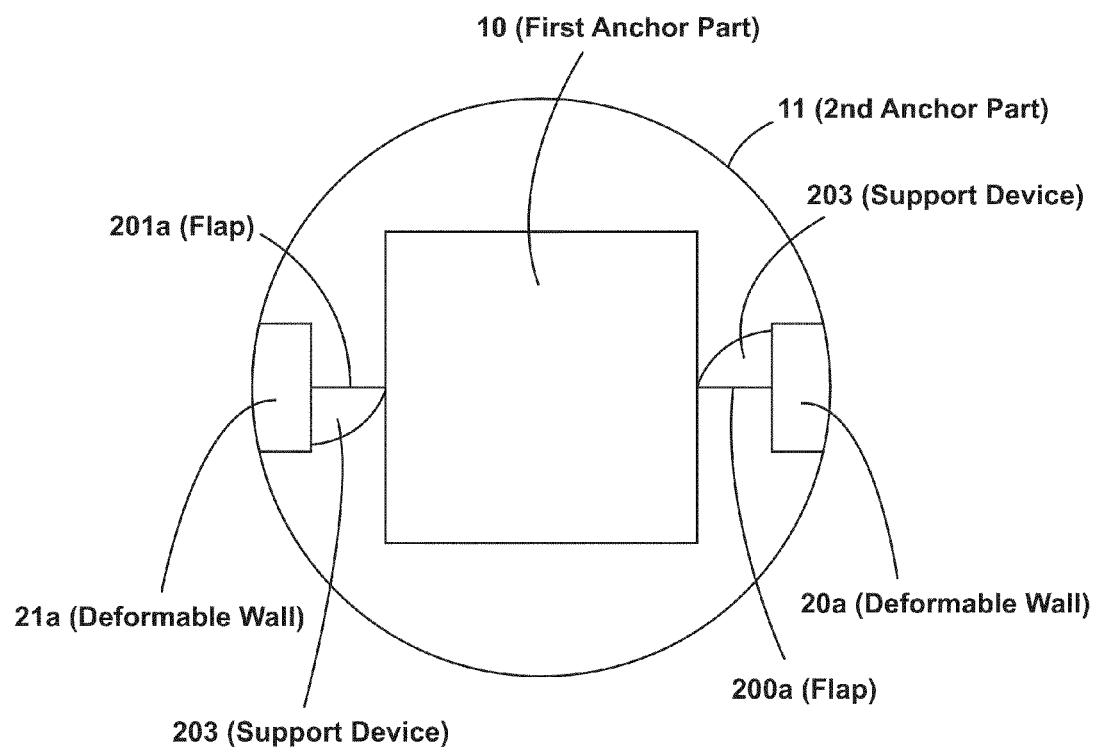
FIG. 7A shows an alternative embodiment of the mounting device of FIG. 7 with the deformable walls each having at least one flap forming an abutting un-bonded contact with the first anchor part.

FIG. 7A shows an alternative embodiment of the mounting device of FIG. 7 with the deformable walls 20a and 21a forming an abutting un-bonded contact with the first anchor part 10. In particular, in the this embodiment, those walls 20a, 21a terminate in flaps 200a, 201a and it is the free edges of those flaps 200a, 201a remote from the second anchor part 11 which abut the first anchor part 10. Each support device 203 in the form of a thin web is attached to each of the flaps 201a or 200a and to the adjacent parts of the wall 21a and 20a accordingly, and is configured so that it provides rigid support to the flaps and permits clockwise movement of the flaps 200a and 201a when the pressure difference exceeds the predetermined value.

A plurality of support devices 203 are provided along the axial length of the flap 201 to ensure uniform folding of the flap 201 along its entire length. This ensures that there is a quick transition from the state in which flap 201 blocks fluid movement between the chambers 22, 23 and the state in which it permits such fluid movement. Moreover, because the flap 201 folds along its entire length, a large volume of fluid may flow between the chambers at that time.

It should also be noted that since the support devices 203 are attached to the flap 201 and the wall 21, they resist pivoting of the flap 201 in the anticlockwise direction in FIG. 8 so that the flap 201 does not control fluid movement from the chamber 23 to the chamber 21. Instead, such movement is controlled by the flap 201 which is also arranged to pivot clockwise in FIG. 7 about its inner edge attached to the wall 20, as determined by corresponding support devices 203, to permit fluid flow between the chambers 23 and 22 when there is a sufficient over-pressure in chamber 23.

Thus, at pressures below the predetermined value, the support devices 203 will hold the flap 201 so that its radially outer end is in contact with the sleeve 11, thereby ensuring that no fluid can pass between the flap 201 and the sleeve 11. Any fluid moving between the chambers 22, 23 must be by way of the passageway interconnecting those chambers (the passageway 24 in the mounting device of FIGS. 1 to 6, which passageway 24 is not shown in FIGS. 7 and 8). However, when the pressure in the chamber 22 exceeds the predetermined value, the support devices 203 collapse, permitting the flap 201 to rotate clockwise in FIG. 8, about its inner edge 202. The radially outer edge of the flap 201 then moves out of contact with the sleeve 11, creating a fluid flowpath around the flap 201 between the chambers 22 and 23. As mentioned before it can be seen from comparison of FIGS. 7 and 8 that the flap 201 is primarily concerned with fluid movement from the chamber 22 to the chamber 23, whereas the flap 200 is concerned primarily with movement of the fluid from the chamber 23 to the chamber 22, because of the inclination of the flaps 200, 201. Thus, the action of the flaps provides a bypass around the walls 20, 21 in manner similar to that achieved in the mounting device of FIGS. 1 to 6. However, it has been found that the flaps, and corresponding support devices, enable the fluid flow more accurately to be controlled.

Note that it may be possible to provide a plurality of flaps, and associated support members, on the edge of either or both of the deformable walls 20, 21. It may then be possible to arrange for those flaps to move, due to deformation of the corresponding support member, at different predetermined pressures, so the size of the bypass path around the walls 20, 21 may vary at different pressures.

Figure 9:
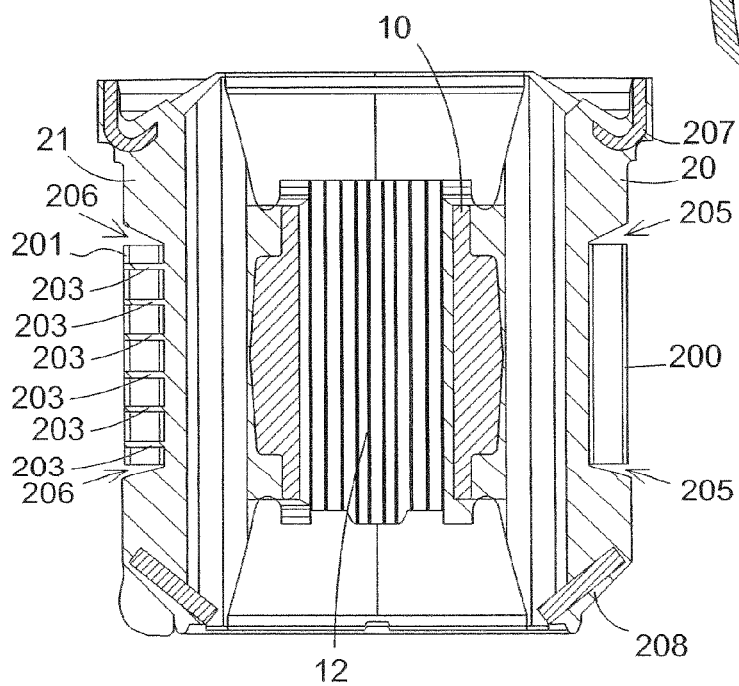
FIG. 9 is a longitudinal sectional view through the mounting device of FIG. 7.

FIG. 9 also shows that the flaps 200, 201 extend only along part of the axial length of the walls 20, 21. At other parts of the axial length, the walls 20, 21 may correspond more closely to the arrangements shown in FIGS. 1 to 6. There are, in the view shown in FIG. 9, apparently gaps 205, 206 between the flaps 200, 201 and the rest of the walls 20, 21 but in fact such gaps would be closed when the mounting device is in the assembled condition, by appropriate deformation of the walls 20, 21 and the flaps 200, 201. Note also that the view shown in FIG. 9 omits the sleeve 11. However, it illustrates the brackets 207, 208 which enable the sleeve to be fixed onto the rest of the mounting device.

Figure 10:
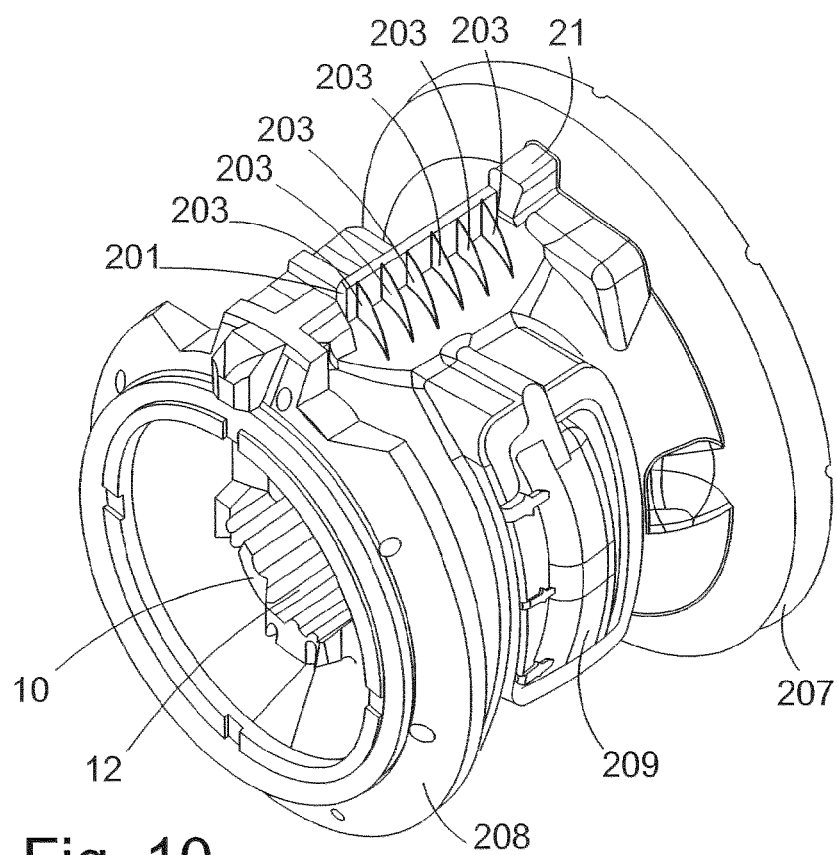
FIG. 10 is a perspective view of part of the mounting device of FIG. 7.
Figure 11:
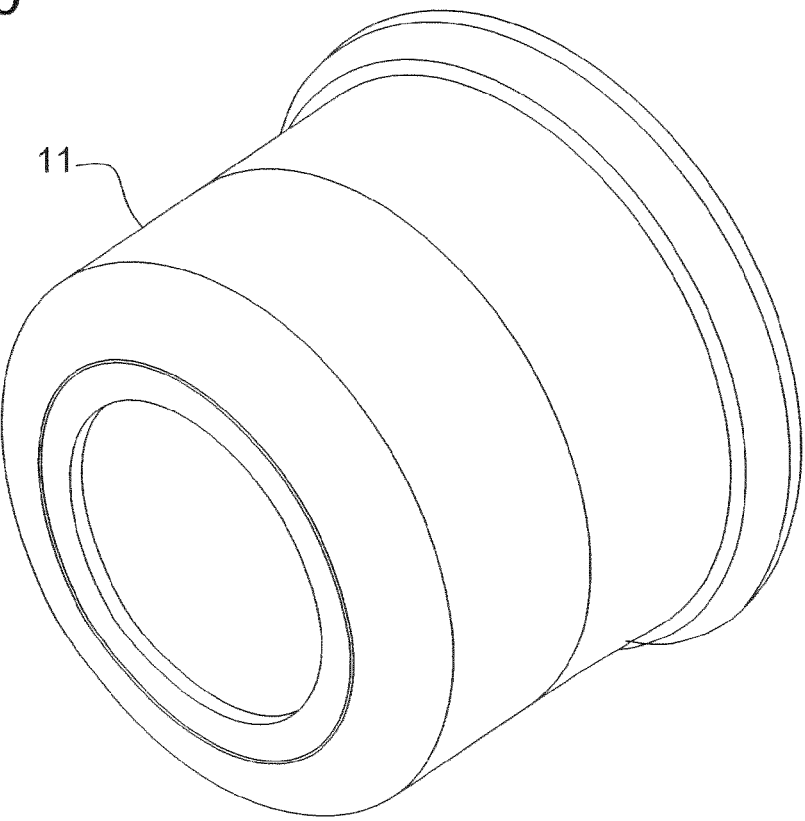
FIG. 11 is a perspective view of the sleeve of the mounting device of FIG. 7.

FIG. 10 shows an isometric view of the structure shown in FIG. 9, again with the sleeve omitted. The view in FIG. 10 shows that at positions circumferentially spaced by 90" from the flaps 200, 201 there may be bump stops 209, 210 (the second bump stop is not visible in FIG. 10 but can be seen in FIG. 7) corresponding to wings 113 in FIGS. 5 and 6. The structure of FIG. 10 is then received in the sleeve 11 illustrated in FIG. 11, the sleeve making contact with the brackets 207, 208.

Figure 12:
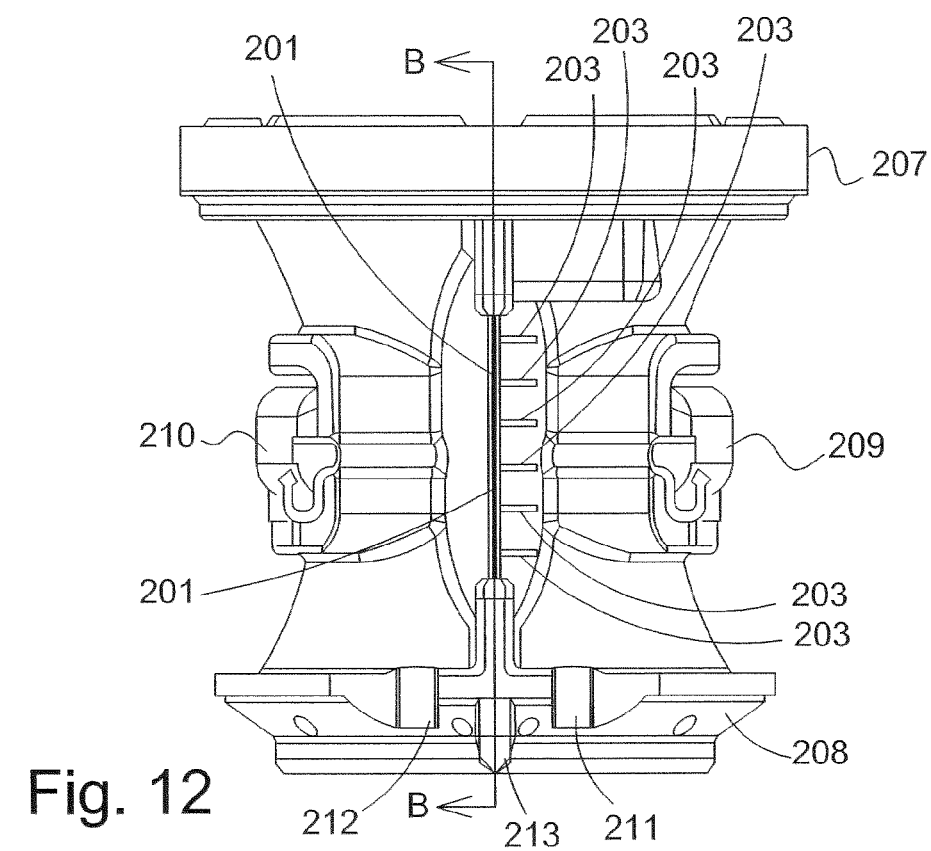
FIG. 12 is a side view of the mounting device of FIG. 7, the view of FIG. 9 being taken along the line B to B in FIG. 12.
Figure 13:
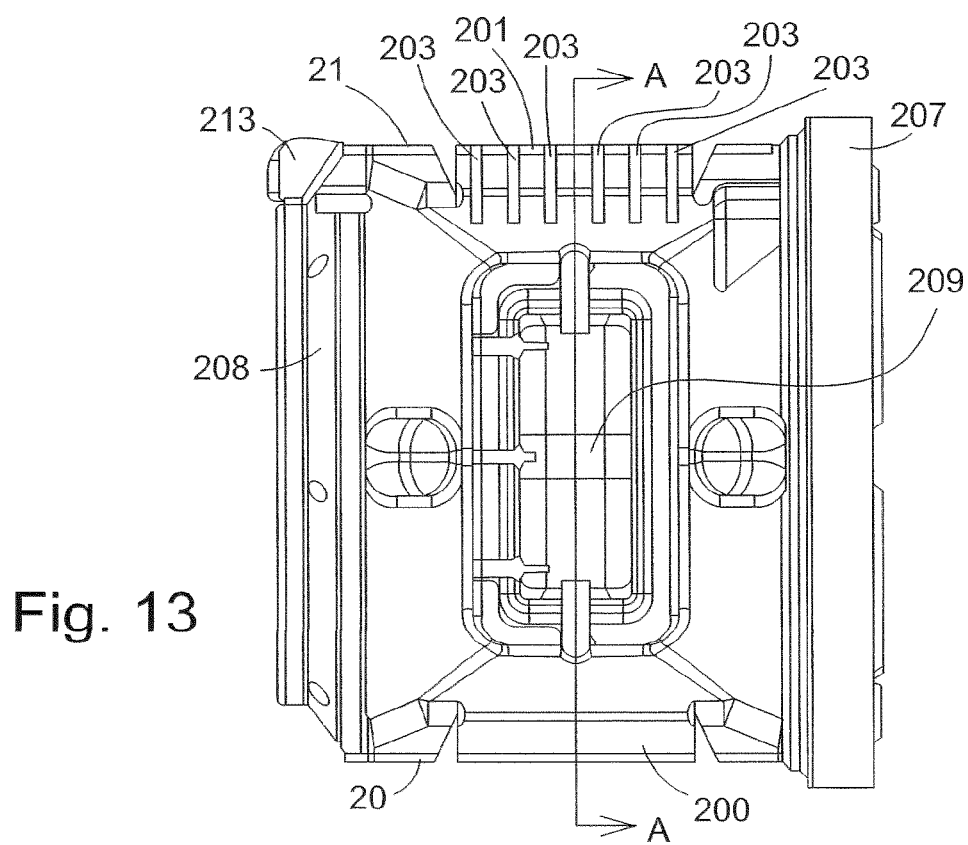
FIG. 13 is another side view of the mounting device of FIG. 7, FIG. 7 being taken along the line A to A in FIG. 13.

FIG. 12 shows a side view of the structure shown in FIG. 10, looking down on the flap 201. FIG. 12 illustrates the openings 211, 212 in bracket 208 which act as outlets from the chambers 23, 22 respectively. Those openings 211, 212 communicate with a space between the bracket 208 and sleeve 11, which space is closed by a stop 213, thereby to form the passageway linking the chambers 22, 23, corresponding to the passageway 24 in FIG. 1. Similarly, FIG. 13 is another side view of the structure, but at right angles to FIG. 12.

Thus, by modifying the arrangements of GB-A-2322427 by providing the flaps 200, 201, the movement of which is controlled by the support devices 203, improved fluid bypass arrangements can be achieved.

In the embodiment discussed above, the flaps 200, 201 have a relatively simple structure. A modification to the first embodiment will now be discussed, in which the form of the flaps 200, 201 is modified in order to improve the consistency of the behavior of the flaps 200, 201 by forcing the flaps 200, 201 to adopt a particular configuration when in use.

Thus, FIGS. 14a to 14c show such a modified flap 201. Note that the flap 200 will have the same configuration. FIGS. 14a to 14c, components which have the same configuration as in FIGS. 7 to 13 are indicated by the same reference numerals. However, in this modification, the flap 201 has a notch 250 therein at a mid-point along its length. Moreover, the ends 251 of the walls 21 are tapered outwardly and stepped. The outward tapering is clearly shown in FIGS. 14a, and the step to produce spaced apart end surfaces 251a and 251b is shown in FIG. 14b. Because of that step effect, there is an abutment surface 251c, shown in FIG. 14c, parallel to the plane of the flap 201.

FIGS. 14a to 14c show the shape of the flap 201 and the wall 21 when those components are moulded. Once those components are assembled into the sleeve 11, they adopt the positions shown in FIGS. 15a to 15d. At first sight, from FIG. 15a, all that has happened when the structure is inserted into the sleeve 11 is that the radially outer edge of the flap 200, and wall 21 become aligned and the tapered surfaces 251 are forced against the flap 200. Notch 250 is closed. However, the view in FIG. 15b and 15c shows that a more complex shape is adopted, in which the flap 201 forms two curved parts 201a, 201b on either side of the notch 250 and the axial ends of the flap 200 are forced into abutment both with the surfaces 251b and with the surfaces 251c.

Thus, the existence of the notch 250 dictates the shape of the flap 201, and the abutment of the flap 201 onto the surfaces 251c restricts fluid flow around the axial ends of the flap 201, by forming an interlocking arrangement providing a seal when the wall 21 and flap 201 is under compression due to the sleeve 11. Hence, a more reliable performance can be achieved, since it is less likely that there will be any fluid flow around the axial ends of the flap 201 between the fluid chambers, and thus there is a greater likelihood that the flap 201 will deform in the correct manner.

Note that FIG. 15d shows the abutment of the axial end 252 of the flap 201 and the surface 251c in greater detail.

Figure 16A:
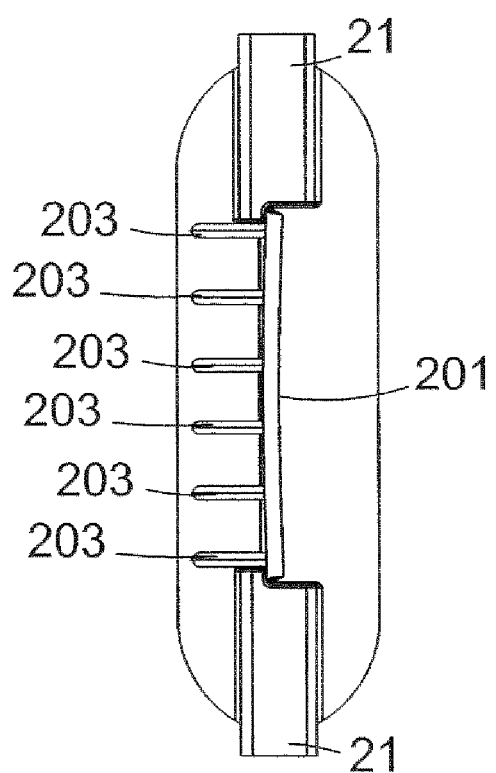
FIGS. 16a and 16b shows a further modification of part of the mounting device of FIG. 7.
Figure 16B:
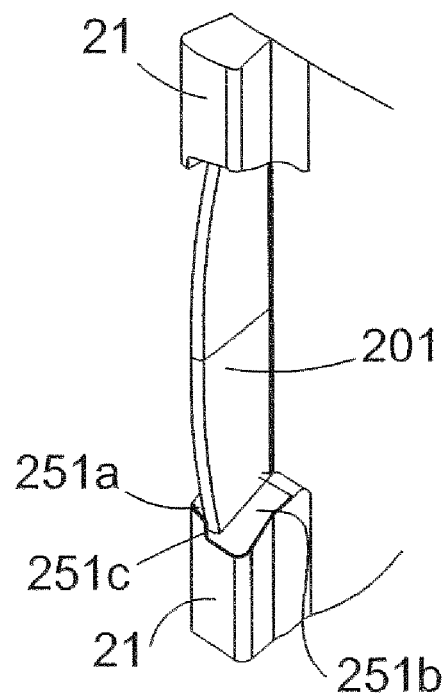

Alternative arrangements with a notch or notches on one or both sides of the flap 201 (and the flap 200) may be used. For example, the arrangement shown in FIG. 16a and 16b makes use of a series of notches on the opposite side of the flap 201 from the support device 203. The arrangement is otherwise the same as in FIGS. 14a to 15d, and will not be described in further detail.

A second embodiment of the invention will now be described with reference to FIGS. 17 to 23. Again, the principles of operation of the second embodiment are in general similar to the mounting device described with reference to FIGS. 1 to 6, and also of the first embodiment. Therefore, where possible, corresponding parts are indicated by the same reference numerals. Those corresponding parts will therefore not be described in detail.

In the second embodiment, the bypass route between the chambers 22, 23 is not primarily formed between the free edges of the axial extending walls 20, 21 and the sleeve, nor is it provided by the flaps on those walls. Instead, each wall 20, 21 contains a valved opening 301, 302. Those valved openings 301, 302 are arranged to open at a predetermined pressure to allow fluid to pass through those valved openings 301, 302 between the chambers 22, 23.

Figure 17:
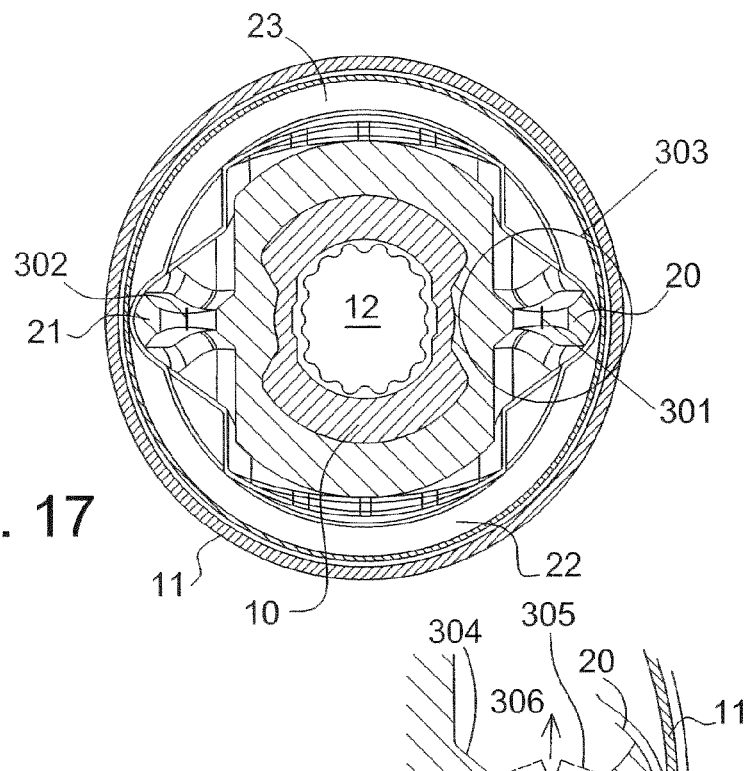
FIG. 17 is a transverse sectional through a mounting device being a second embodiment of the present invention.
Figure 18:
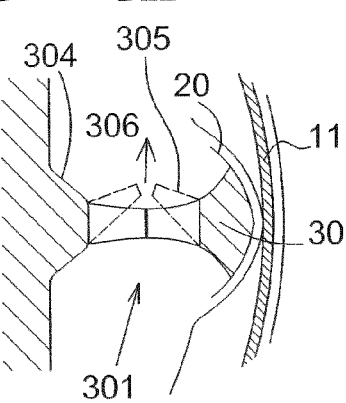
FIG. 18 is a detail of the mounting device of FIG. 17.

FIG. 18 shows in more detail the part of the mounting device within the circle 303 in FIG. 17. FIG. 15 illustrates that the axial wall 21 has a reduced thickness region 304 which contains the valved opening 302. The valved opening comprises a plurality of flaps which move when the pressure difference between the chambers 22, 23 is at a predetermined value or greater, to create a fluid path between those chambers 22, 23. Thus, as illustrated in FIG. 18, at or above the predetermined pressure the flaps deform to e.g. the position shown at 305 to create a fluid flow path 306. FIG. 15 also shows that the outer edge 30 of the resilient wall 21 makes abutting un-bonded contact with the sleeve 11.

The arrangement of the wall 21 and the valved opening 302 is similar to that shown in FIG. 18.

Figure 19:
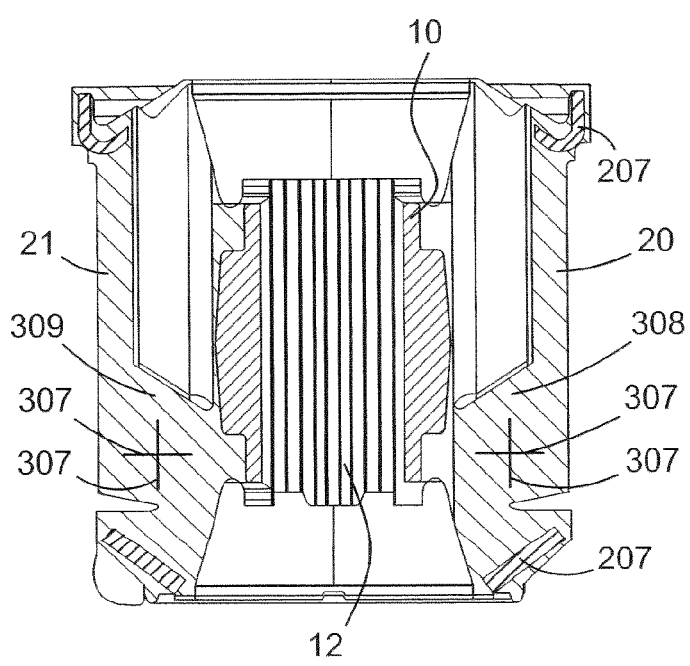
FIG. 19 is a longitudinal section view through the mounting device of FIG. 17.
Figure 20:
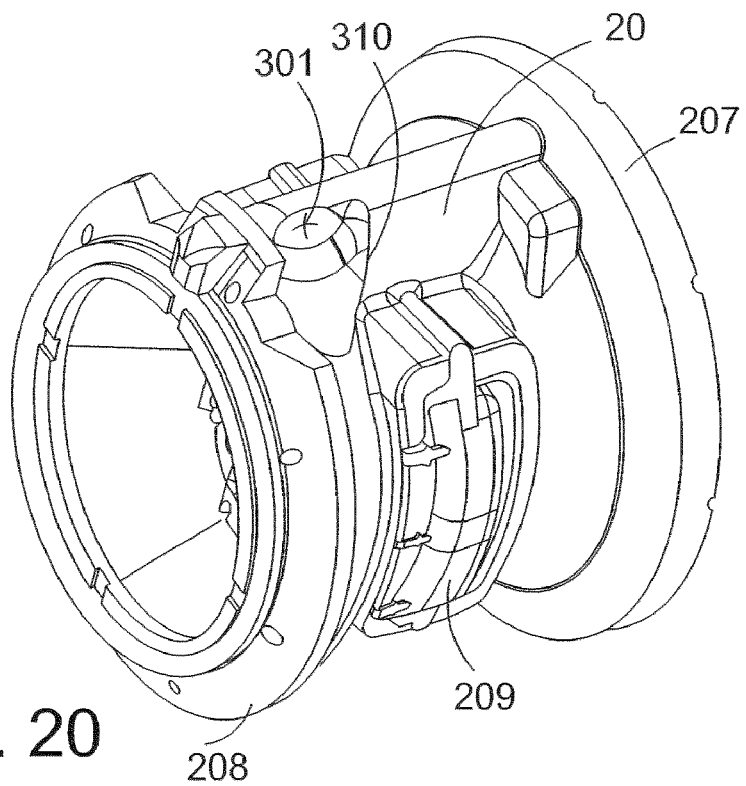
FIG. 20 is a prospective view of part of the mounting device of FIG. 17.
Figure 21:
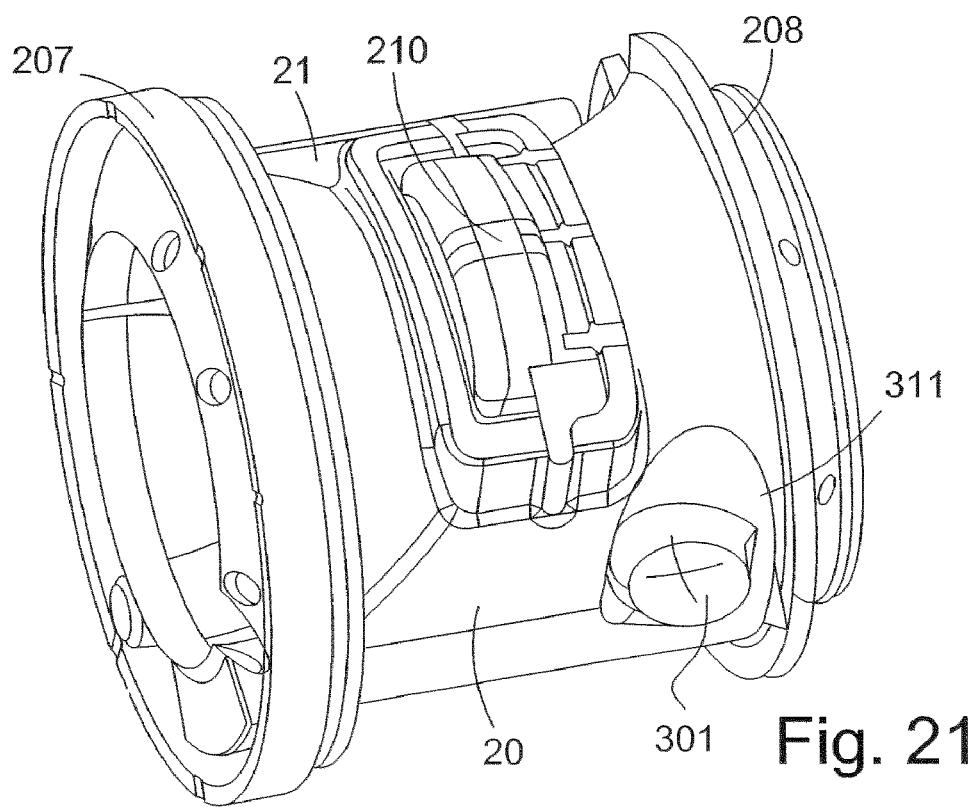
FIG. 21 is another prospective view, from a different angle, of the part of the mounting device of FIG. 17.

The configuration of the valved openings 301, 302 can be seen from FIG. 19 in which the sleeve 11 is omitted. As illustrated in that figure, crossed-slits 307 are provided in parts 308, 309 of the axial walls 20, 21 which slits 307 create moveable flaps in those wall parts 308, 309. Those flaps are arranged to deform at or above the predetermined pressure, thereby opening the slits 307 to create the fluid path 306 shown in FIG. 18, and the corresponding fluid path in the axial wall 21.

In order to provide an unobstructed path to the valved openings 301, 302 cut-out regions may be provided in the axial walls 20, 21 adjacent to the valved openings 301, 302. Such cut-out regions 310, 311 are illustrated for valved opening 301 in FIGS. 20 and 21. Similar, cutout regions are provided for the valved opening 302.

Figure 22:
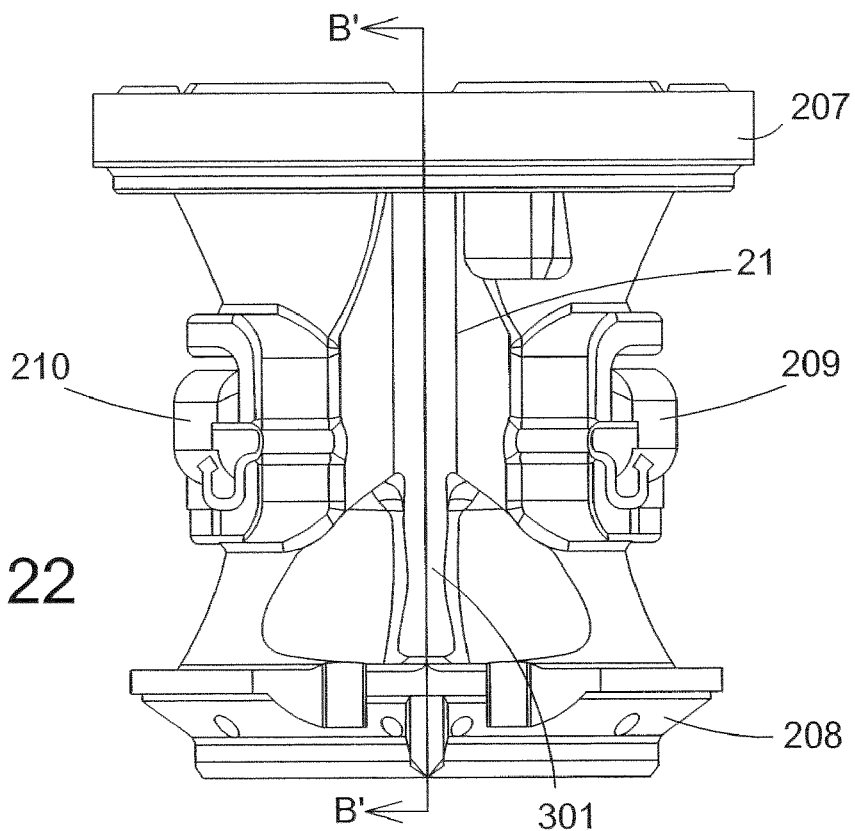
FIG. 22 is a side view of the mounting device of FIG. 17; the view of FIG. 19 being taken along the line of B' to B' in FIG. 22.
Figure 23:
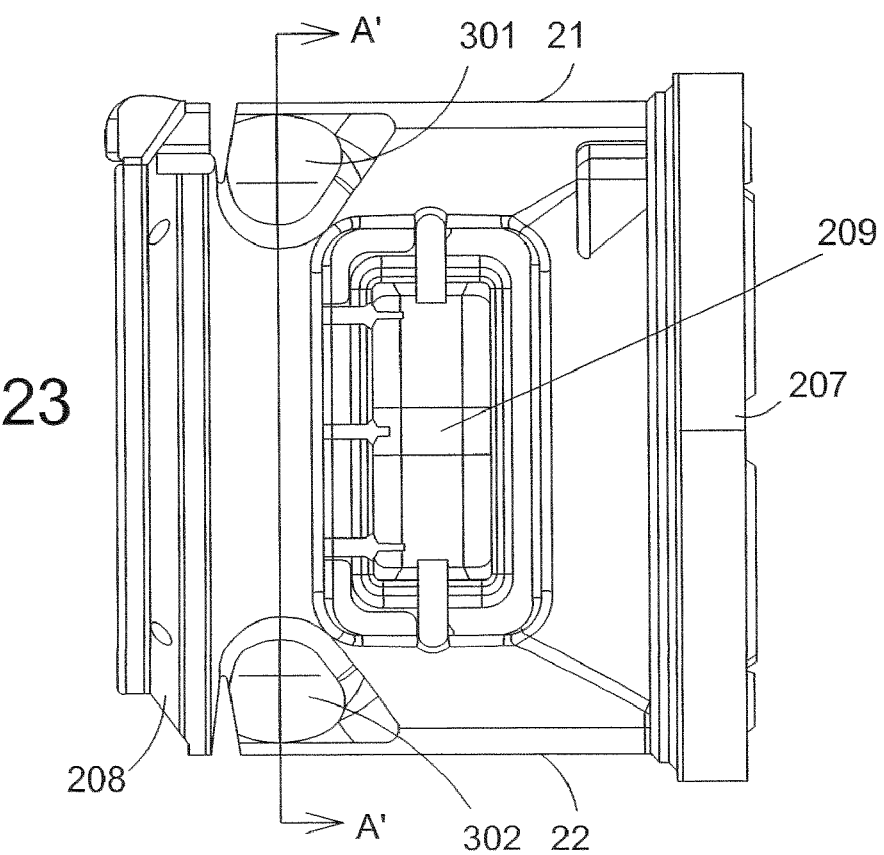
FIG. 23 is another side view of the mounting device of FIG. 17, FIG. 17 being taken along the line A' to A' in FIG. 23.

FIGS. 22 and 23 show similar views to FIGS. 12 and 13, but for the second embodiment. The sleeve used in the second embodiment may be the same as that shown in FIG. 11.

It should be noted that the construction of the valved openings 301, 302 is such that fluid can pass through it is either direction, once the predetermined pressure has been reached. Thus, in the embodiment, fluid passes through both valved openings 301, 302 when the pressure difference between the chambers 22, 23 reach the predetermined value. It may be possible, however, to replace the structures shown in the embodiment with oneway valves to achieve uni-directional flow as in the first embodiment. However, any such one-way valve has to be integrated with the deformable walls 21, 22 without compromising their deformability. Thus, if such a one-way valve is formed by a separate component from the deformable wall, that component must be securely mounted in the deformable wall and capable of allowing the wall to deform normally when the mounting device is used. Indeed, it would be possible to provide components forming a valved opening similar to those shown in FIGS. 17 to 23, but which components are not integral with the deformable wall, but are separate components mounted in that wall. That may enable the properties of the components of the valved opening to be selected in a way that could not be achieved if they were of same material, and integral with, the deformable wall.

Moreover, it may be possible to provide more than one valved opening in each of the deformable walls 21, 22, with the valved openings being arranged to open at different pre-determined pressures. In that way, the amount of fluid that can flow in the bypass route between the chambers 22, 23 is variable depending on the pressure difference between those chambers.

Thus, in this embodiment, by modifying the arrangements in GB-A-2322427 by providing the valved openings in the walls 20, 21, include bypass arrangements can be achieved.

It can be noted that, in the second embodiment, the walls 20, 21 are not hollow, at least in the parts of those walls in which the valved openings 301, 302 are provided. The walls may be hollow at other parts, e.g. adjacent to the bracket 207.

What is claimed:

1. A hydraulically damped mounting device having:
    a first anchor part;
    a second anchor part in the form of a hollow sleeve containing the first anchor part, such that the first anchor part extends axially of the sleeve;
    first and second resilient walls interconnecting the first and second anchor parts, the first and second resilient walls being spaced apart so as to define an enclosed space within the sleeve extending circumferentially around the first anchor part and axially bounded by the first and second resilient walls;
    first and second deformable walls, each extending axially from the first and second resilient walls at circumferentially spaced locations, so as to divide the enclosed space into first and second chambers for hydraulic fluid;
    a passageway interconnecting the first and second chambers, the passageway being for flow of hydraulic fluid therethrough;
    wherein the deformable walls each have at least one flexible flap extending radially therefrom to a free end that forms an abutting un-bonded contact with one of the second anchor part or the first anchor part;
    wherein the deformable walls have an abutment surface parallel to the longitudinal axis of the sleeve, which abutment surface contacts a corresponding the at least one flap when the fluid pressure is below a predetermined fluid pressure; and
    at least one support device extending between each flap and a part of the deformable wall adjacent to the at least one flap, wherein each at least one support device is adapted to resist deformation of the corresponding flap below a pre-determined fluid pressure differential between the first and second chambers and thereby to maintain the free end of that corresponding flap in said abutting unbonded contact with the respective first or second anchor parts, and wherein each at least one support device is adapted to permit deformation of the corresponding flap when the pressure differential between the first and second chambers is above said pre-determined fluid pressure to thereby form a fluid bypass route between said first and second chambers around said corresponding flap, wherein each at least one support device is further adapted to permit fluid flow in only one direction between the first and second chambers so that the at least one flap extending from the first deformable wall will deform to permit fluid flow from the first chamber to the second chamber when the pre-determined pressure differential is greater in the first chamber than in the second chamber and the at least one flap extending from the second deformable wall will deform to permit fluid flow from the second chamber to the first chamber only when the pre-determined pressure differential is greater in the second chamber than in the first chamber.

2. A hydraulically damped mounting device according to claim 1, wherein the least one flap has a notch therein at an intermediate position along the axial length thereof.

3. A hydraulically damped mounting device according to claim 1, wherein said at least one support device includes a plurality of support devices spaced apart along the axial extent of the at least one flap.

4. A hydraulically damped mounting device according to claim 3, wherein the support device associated with the at least one flap is in a form of a thin web attached to the at least one flap and to the deformable wall adjacent to the at least one flap.

5. A hydraulically damped mounting device according to claim 4 wherein the thin webs is integrally molded to the at least one flap and to the deformable wall adjacent to the at least one flap.

6. A hydraulically damped mounting device according to claim 1, wherein the support device associated with the or each flap is in a form of a thin web attached to the at least one flap and to the deformable wall adjacent to the at least one flap.

* * * * *